United States Patent [19]
Welp et al.

[11] Patent Number: 5,202,839
[45] Date of Patent: Apr. 13, 1993

[54] PROCESS FOR THE STORING OF DRAWING DATA BY MEANS OF A CAD FILM-CARD LASER PLOTTER, A MICROFILM CARD AND A CAD FILM-CARD LASER FOR ITS IMPLEMENTATION

[75] Inventors: Ulrich Welp, Bad Nauheim; Stephan Welp, Bad Homburg; Dan Hossu, Giessen, all of Fed. Rep. of Germany

[73] Assignee: Microbox Dr. Welp KG, Bad Nauheim, Fed. Rep. of Germany

[21] Appl. No.: 548,305

[22] Filed: Jul. 5, 1990

[30] Foreign Application Priority Data

Jul. 4, 1989 [DE] Fed. Rep. of Germany ....... 3921905
Oct. 17, 1989 [DE] Fed. Rep. of Germany ....... 3934565

[51] Int. Cl.⁵ .................................................. G06F 15/60
[52] U.S. Cl. ..................................... 364/488; 346/108; 40/159.2
[58] Field of Search ............... 346/108, 154, 160, 762, 346/129; 40/159, 159.2, 158.1; 364/488, 518, 550, 480; 355/100; 395/101, 107

[56] References Cited

U.S. PATENT DOCUMENTS

| | | | |
|---|---|---|---|
| 3,535,039 | 10/1970 | Lakin et al. | 355/100 |
| 3,626,618 | 12/1971 | Tone et al. | 40/159.2 |
| 3,734,736 | 5/1973 | Rudd | 40/159.2 |
| 3,773,511 | 11/1973 | Anderson | 40/159.2 |
| 3,807,073 | 4/1974 | Hofmann et al. | 40/159.2 |
| 3,997,992 | 12/1976 | Anderson | 40/159.2 |
| 4,257,053 | 3/1981 | Gilbreath | 346/108 |
| 4,271,415 | 6/1981 | Murakoshi et al. | 346/108 |
| 4,333,254 | 6/1982 | Stevenson | 40/159.2 |
| 4,467,335 | 8/1984 | Schmidt et al. | 346/108 |
| 4,634,269 | 1/1987 | Welp et al. | 355/100 |
| 4,764,778 | 8/1988 | Spektor et al. | 346/160 |
| 4,769,694 | 9/1988 | Oshikoshi | 346/110 R |
| 4,777,495 | 10/1988 | Spektor et al. | 346/108 |
| 4,814,793 | 3/1989 | Hamada et al. | 346/108 |
| 4,884,885 | 12/1989 | Schweinsberg | 40/159.2 |

*Primary Examiner*—Kevin J. Teska
*Attorney, Agent, or Firm*—Wegner, Cantor, Mueller & Player

[57] ABSTRACT

Process for the storing of drawing data by means of a CAD film-card laser plotter, a microfilm card and a CAD film-card laser plotter for its implementation are described. A microfilm card has two film regions (2, 3), each of which is formed by a film window (4, 5) with a photographic film. Vector and/or raster data for generating an ordinary film image are stored on one film region (2), the associated CAD model data which are used by a CAD drawing system are stored on the other film region (3). In this way, the CAD model data need not be separately digitally stored. The CAD model data can be read from the film region (3) back into the CAD drawing system by means of a scanner as needed.

16 Claims, 2 Drawing Sheets

PROCESS FOR THE STORING OF DRAWING DATA BY MEANS OF A CAD FILM-CARD LASER PLOTTER, A MICROFILM CARD AND A CAD FILM-CARD LASER FOR ITS IMPLEMENTATION

BACKGROUND OF THE INVENTION

The invention relates to a process for the storing of drawing data of a CAD drawing system by means of a CAD film-card laser plotter, wherein the vector and/or raster data are stored optically on a film of a microfilm card. The invention relates further to a microfilm card and a CAD film-card laser plotter for implementation of this process.

To output CAD drawings on microfilm, the CAD model data of the drawing are converted in the computer into two-dimensional vector and/or raster data of which the graphical representation of the drawing consists. However, since the CAD model data also contains other additional data with which the computer works, they have to be stored digitally all together on magnetic disks or optical memory disks. Only in this manner has it been possible heretofore to play back all the CAD model data into the working memory of a CAD system at a later time. Hence, for the long-term storage of CAD drawings, it has been necessary heretofore to keep two archives. A film-card archive contains the graphical representation of the drawings and is evaluated with readers and enlargers. In addition, a digital tape or disk archive has to be kept which contains all the binary CAD model data and is used to "play back" the digital model data for the CAD change designs into the working memory. For several reasons, this need to keep two archives/files is extremely expensive with respect to organization and costs. Thus, for example, preservation of the digital data on magnetic tapes or disks requires frequent "refreshing" in order that the data remain satisfactorily preserved. Also, maintenance of the digital data of the various revisions of drawings over a long period of time requires considerable expense. It makes it necessary to keep an additional data base and entails a large economic risk due to the rapid changing of hardware and software systems.

In the case of microfilm cards, it is known to provide, in addition to the film image, a magnetic strip on which additional data belonging to the film image are stored. It is also known to provide on a film image a coding which contains machine-readable data for the identification and classification of the drawing. A feature common to such additional storage fields on microfilm cards is that they serve to store data which are useful for the organizational evaluation of the card archives, e.g. sorting or selecting of cards.

Commonly used for the storing of vector and/or raster data are CAD film-card laser plotters which have a laser exposure station, a development station, an inscription station and a duplication station. For example, such a CAD film-card laser plotter is illustrated in FIG. 3 of EP-A-85108144.8 and explained in the specification. The known CAD film-card laser plotter makes it possible for model data of CAD drawing systems converted into raster data to be exposed on the film of the film card, the film to be developed immediately and the film card to be inscribed. The CAD film-card laser plotter also makes it possible for the original film cards to be duplicated immediately on silver film cards, for which purpose the same inscription and development device is used as for the original film cards.

SUMMARY OF THE INVENTION

The underlying object of the invention is to develop a process for the storing of drawing data which makes possible a rapid use of a microfilm card in readers or enlargers as well as a re-reading of the CAD model data into a CAD drawing system. Furthermore, a microfilm card and a CAD film-card laser plotter are to be created for implementing this process.

The first problem discussed above is solved according to the invention in that computer-compatible data (CAD model data) corresponding to the vector and/or raster data are additionally stored digitally on a second film window of the microfilm card.

By means of this process, the microfilm card is optimally suited both for graphical evaluation in readers and enlargers and for re-input of the CAD model data into the CAD drawing system. Accordingly, after the data are stored on the microfilm card, a magnetic data storage is not necessary. There is also a substantially larger safety margin against data loss. The data are stored reliably on the silver film of the microfilm card for many decades without any data maintenance and can be rapidly read into a CAD drawing system when needed.

The second problem discussed above, namely the creation of a microfilm card for implementation of the process according to the invention, is solved according to the invention in that it has two film windows with one film each and that one film window is provided with a film for storing the vector or raster data and one film window is provided with a film for storing computer compatible data (CAD model data). Such a microfilm card can be used like ordinary film cards in a microfilm reader or in an enlarger for enlarging the drawing, but it can also be used for reading computer-compatible data back into a CAD drawing system by means of a scanner.

The microfilm card can be constructed similarly to microfilm cards known heretofore and can additionally have clear text on cardboard so that it can be identified by the user even without machine assistance if, according to an advantageous refinement of the invention, the two film windows are provided symmetrically to each other near the two narrow sides, and the space above, between and below the film windows is provided for printing with additional data.

A CAD film-card laser plotter for implementation of the process according to the invention is distinguished by the fact that the laser exposure station, the development station and the duplication station are each designed to act on pieces of film provided in two different film windows of the microfilm card, and that the laser exposure station is designed to expose CAD model data on the film of a film window of the microfilm card intended for binary data and additionally to expose vector and/or raster data on the film of a film window of the microfilm card intended for graphics.

With such a CAD film-card laser plotter, it is possible to produce, in a simple manner and very quickly, microfilm cards which have one film window with an ordinary drawing representation and one film window with the CAD model data used to generate the drawing. Then one can use the film with the CAD model data to read back the data by means of a scanner.

Computer-controlled laser-beam devices for exposing a film are relatively expensive to procure. The use of two laser-beam devices for CAD film-card laser plotters can be dispensed with if, according to an advantageous refinement of the invention, the laser exposure station has a single computer-controlled laser-beam device to expose the film window intended for data and the film window intended for graphics, and if the CAD film-card laser plotter has a transport device to transport the microfilm cards into the laser exposure station, first with the film window intended for CAD model data and, after that film window is exposed, then with the film window intended for graphics. Since the CAD model data in the CAD drawing system are available immediately, it is logical to expose them first on the microfilm and then not to expose the film of the film window intended for graphics until after the CAD model data has been converted into vector and/or raster data.

If one stores the CAD model data of drawings on microfilm, one can dispense with storing those data on magnetic memories or optical memory disks. However, this presupposes an inspection of the storage on the film. The storage of the CAD model data in the film window intended for them can be inspected in a simple window if, according to an advantageous refinement of the invention, the laser exposure station has a read head for reading the information exposed on the film of the film window intended for data. The CAD microfilm plotter must then transport the finished film card from the development station back to the laser exposure station. The read head then compares the data of the film window intended for data with the CAD model data located in the computer.

However, the storage could also be inspected by means of a test strip on the film, which is inspected in an inspection station between the development station and the inspection station.

The device for inspecting the microfilm cards has an especially simple design if the read head is disposed on the side of the film card opposite the laser-beam device. The developed film card can then be scanned by the laser beam, and the information read by the read head can subsequently be compared with the original data in the computer.

The model data can be stored on the microfilm in a manner similar to how they are stored on a diskette, so that they can also be found again in a similar manner if the laser-beam device is designed for track marking in the direction of motion of the microfilm card and/or perpendicular thereto for row-by-row application of the information.

The CAD film-card laser plotter works especially quickly if the development station and the duplication station are designed for simultaneous treatment of the film of both film windows of the microfilm card.

BRIEF DESCRIPTION OF THE DRAWINGS

The invention permits numerous embodiments. For further clarification of their basic principle, reference is made hereinbelow to the drawings in which.

DETAILED DESCRIPTION

Figure 1:
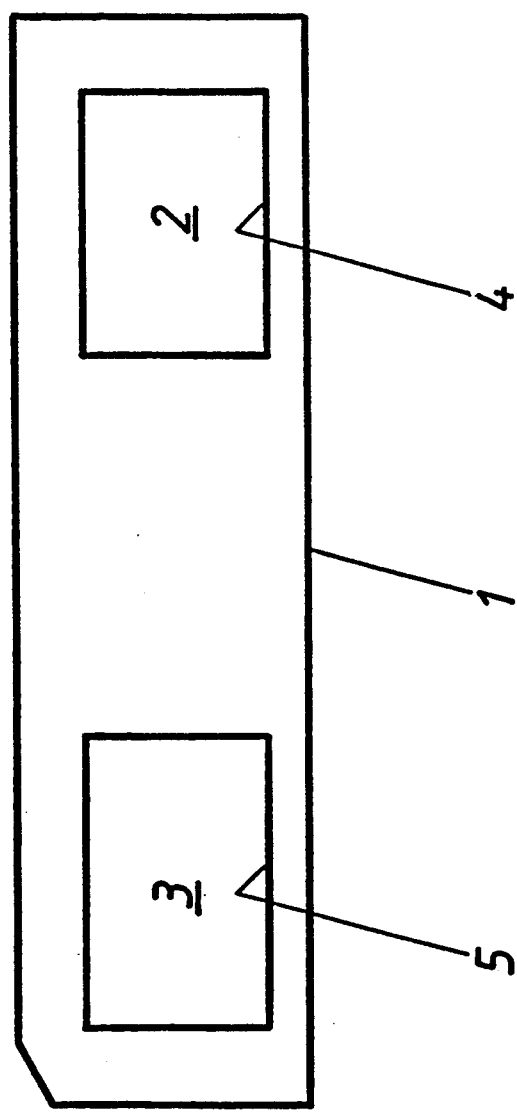
FIG. 1 shows a plan view of a microfilm card according to the invention.

The microfilm card 1 shown in FIG. 1 is made of cardboard and has two film regions 2, 3, each of which is formed by a photographic film inserted into a film window 4, 5. The microfilm card 1 can have an ordinary header line inscribed with cleartext. The region above, between and below the film windows 4, 5 can also be used for an inscription with cleartext.

It is important for the invention that one film window, the film region 2 for example, is intended for vector and/or raster data, and the other film region 3 is intended for the associated CAD model data. Accordingly, an ordinary drawing is reproduced in raster representation on the film region 2, for example, so that this film region can be used for reading or enlarging.

If one wants to read back into a CAD drawing system by means of a scanner the CAD model data that resulted when the drawing was generated, then one uses the other film region 3 for that purpose. Since the CAD model data is mapped on it in the form of dots or dashes, the readback presents no difficulties and is possible without errors in an extremely short time.

Figure 2:
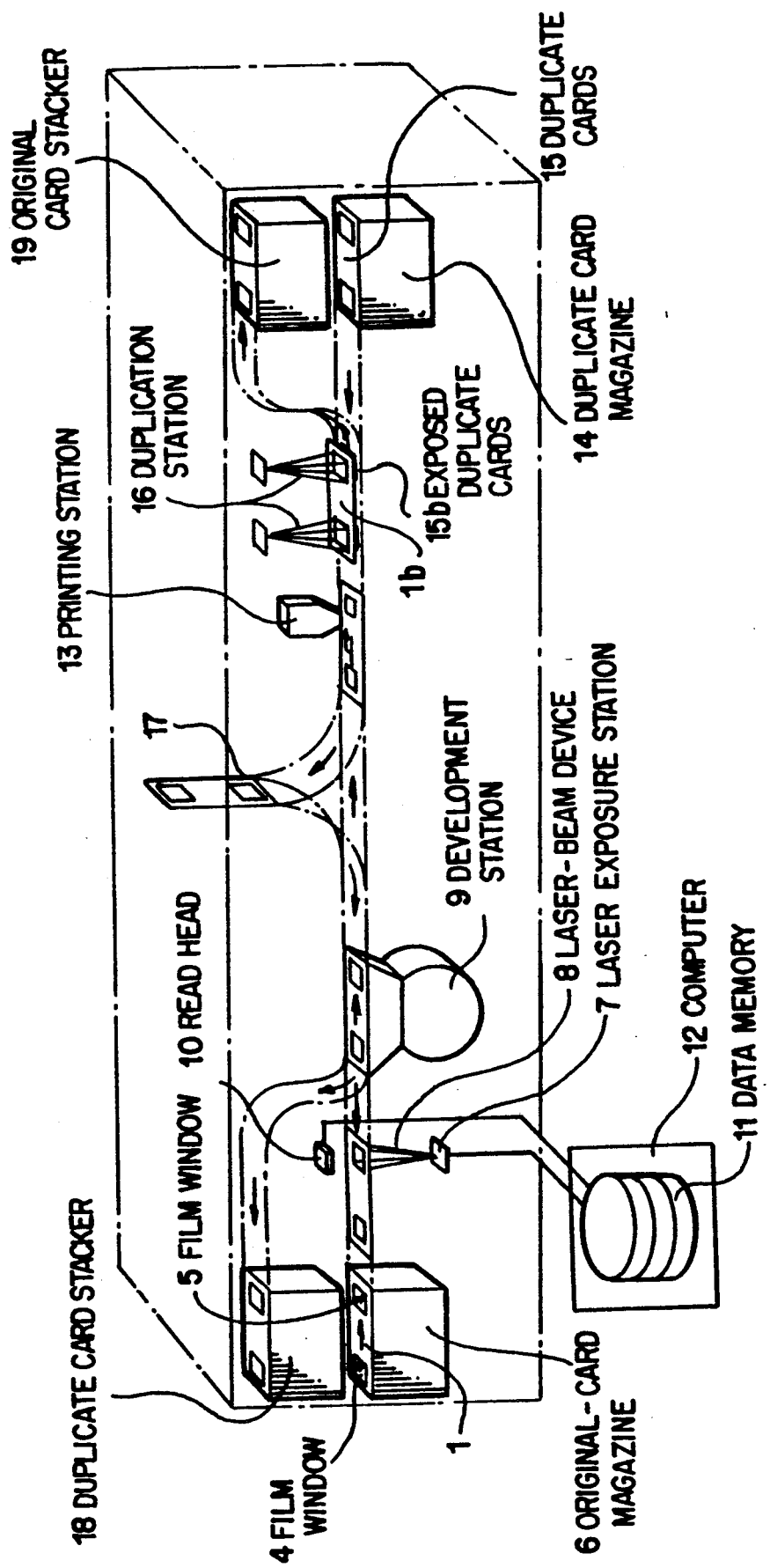
FIG. 2 shows a perspective illustration of a CAD film-card laser plotter according to the invention.

The CAD film-card laser plotter illustrated in FIG. 2 has an original-card magazine 6 from which the unexposed microfilm cards 1 are transported to a laser exposure station 7. Shown on the microfilm card 1 are the two film windows 4, 5, of which one film window 5 (data window) is intended for the exposure of CAD model data and one film window 4 (graphics window) is intended for the exposure of the vector and/or raster data obtained therefrom. The microfilm cards 1 have their opposite side facing upward in the CAD film-card laser plotter, as in FIG. 1. These data are exposed by means of a laser-beam device 8 in the laser exposure station 7 in such a manner that the film window 5 and the film window 4 are positioned and exposed in succession.

After the exposure, the microfilm card 1 is conveyed to a development station 9. It is designed as a double development station and enables the film of both film windows 4, 5 to be developed simultaneously.

After the development, the microfilm card 1 goes back to the laser exposure station 7. A read head 10 is provided on the side of the microfilm card 1 opposite the beam device 8. This read head is connected to a computer 12 which has a data memory 11 and which controls the laser-beam device 8 during the exposure of the data. In this computer 12, the data read from the film window 5 are compared with the original data controlling the laser-beam device 8. If they agree, then all the data are stored on the microfilm card 1.

The inspected microfilm card 1 is fed from the laser exposure station 7 to a printing station 13 where it is inscribed with machine-readable identification data.

The CAD film-card laser plotter also makes it possible to produce duplicate cards. For that purpose it has a duplicate card magazine 14 with duplicate cards 15 whose construction matches that of the original microfilm cards 1, except that they are fitted with silver duplicating film. The duplicate cards 15 arrive at a duplication station 16 where they pass under the microfilm card 1b to be duplicated and are exposed simultaneously by the contact exposure method in the two film windows 4, 5.

While the original microfilm card 1b remains in the duplication station 16 until the desired number of duplicates have been exposed, the exposed duplicate cards 15b are each fed in the reverse direction to the printing station 13 where they are inscribed in the same manner as the original microfilm cards 1.

During the contact exposure the emulsion side of the duplicate cards 15b faces upward. However it must face downward during the development in the development station 9 so that they can be chemically treated. Accordingly, a turnover station 17 is provided between the printing station 13 and the development station 9. After the development of the duplicate cards 15, 15b, they are conveyed to a duplicate-card stacker 18 above the original-card magazine 6. The original microfilm cards 1 go to an original-card stacker 19 on the opposite side of the CAD microfilm laser plotter.

What is claimed is:

1. A process for storing drawing data for a CAD drawing on a microfilm card having two film windows using a CAD film-card laser plotter, comprising the steps of:
   optically storing vector and/or raster data on a first film disposed in one of the two film windows using the CAD film-card laser plotter; and
   digitally storing CAD model data corresponding to said vector and/or raster data on a second film disposed in the other film window using the CAD film-laser plotter.

2. A microfilm card, comprising:
   a card;
   a first film window formed in said card and having first means for storing vector and/or raster data disposed therein; and
   a second film window formed in said card and having second means for storing CAD model data disposed therein.

3. A microfilm card as claimed in claim 2, wherein said card is formed substantially as a rectangle having a major axis and a minor axis, wherein said first film window and said second film window are formed in said card symmetrically with respect to said minor axis, and wherein a surface portion of said card surrounding said first and second film windows is adapted to be printed with additional data.

4. A CAD film-card laser plotter, comprising:
   a laser exposure station;
   a development station;
   an inscription station; and
   a duplication station;
   wherein the laser exposure station, the development station, and the duplication station act on microfilm cards having film provided in a first window for storing binary data and film provided in a second window for storing graphics data; and
   wherein the laser exposure station is designed to expose CAD model data on the film in the first window and is designed to expose vector and/or raster data on the film in the second window.

5. A CAD film-card laser plotter according to claim 4, wherein he development station and the duplication station are designed for simultaneous treatment of the film provided in the first window and the film provided in the second window.

6. A CAD film-card laser plotter according to claim 4, wherein the laser exposure station has a single computer controlled laser-beam device to expose the film provided in the first window and the second window, wherein said CAD film card laser plotter further comprises transport means for transporting the microfilm cards to the laser exposure station so as to expose first the first film window and subsequently expose the second film window.

7. A CAD film-card laser plotter according to claim 6, wherein the laser beam device is designed for track marking in a direction of motion of the microfilm card and for row-by-row application of the information perpendicular to the direction of motion of the microfilm card.

8. A CAD film-card laser plotter according to claim 6, wherein the laser beam device is designed for track marking in a direction perpendicular to a direction of motion of the microfilm card and for row-by-row application of the information perpendicular to the direction of motion of the microfilm card.

9. A CAD film-card laser plotter according to claim 6, wherein he development station and the duplication station are designed for simultaneous treatment of the film provided in the first window and the film provided in the second window.

10. A CAD film-card laser plotter according to claim 6, wherein the laser exposures station has a read head is disposed on the side of the microfilm card opposite the laser-beam device.

11. CAD film-card laser plotter according to claim 10, wherein the laser-beam device is designed for track marking in the direction of motion of the microfilm card and/or perpendicular thereto and for row-by-row application of the information perpendicular to the direction of motion of the microfilm card.

12. A CAD film-card laser plotter according to claim 4, wherein the laser exposure station has a read head for reading the information exposed on the film provided in the first window, and wherein sad CAD film-card laser plotter further comprises return means for transporting microfilm cards from the development station to the laser exposure station, and wherein the read head is connected to a computer which controls the laser beam device so as to compare data controlling the laser beam device with the read data.

13. A CAD film-card laser plotter as claimed in claim 12, wherein the read head is disposed on a side of the microfilm card opposite the laser beam device.

14. A CAD film-card laser plotter according to claim 12, wherein the laser beam device is designed for track marking in a direction of motion of the microfilm card and for row-by-row application of the information perpendicular to the direction of motion of the microfilm card.

15. A CAD film-card laser plotter according to claim 12, wherein the laser beam device is designed for track marking in a direction perpendicular to a direction of motion of the microfilm card and for row-by-row application of the information perpendicular to the direction of motion of the microfilm card.

16. A CAD film-card laser plotter according to claim 12, wherein the development station and the duplication station are designed for simultaneous treatment of the film provided in the first window and the film provided in the second window.

* * * * *